United States Patent

Derner

[11] 3,868,151
[45] Feb. 25, 1975

[54] ROLLER BEARING WITH TAPERED OUTER RACE RING

[75] Inventor: William J. Derner, Indianapolis, Ind.

[73] Assignee: FMC Corporation, San Jose, Calif.

[22] Filed: May 4, 1973

[21] Appl. No.: 357,282

[52] U.S. Cl. .................................................. 308/207
[51] Int. Cl. ............................................ F16c 13/00
[58] Field of Search .................................... 308/207

[56] References Cited
UNITED STATES PATENTS

| 1,444,964 | 2/1923 | Foster | 308/214 |
| 2,659,637 | 11/1953 | Barr | 308/207 |
| 2,947,196 | 8/1960 | Van Dorn et al. | 308/216 |
| 2,987,351 | 6/1961 | Aberle | 308/207 |

Primary Examiner—M. Henson Wood, Jr.
Assistant Examiner—Richard A. Bertsch
Attorney, Agent, or Firm—J. F. Verhoeven; C. E. Tripp

[57] ABSTRACT

A bearing assembly is disclosed in which the outer race rings of a double row, spherical roller bearing are fitted into a bearing seat. One end of the outer surface of each outer race ring is relieved, or tapered, to distribute the radial load and prevent roller edge loading.

6 Claims, 2 Drawing Figures

PATENTED FEB 25 1975
3,868,151
FIG_1
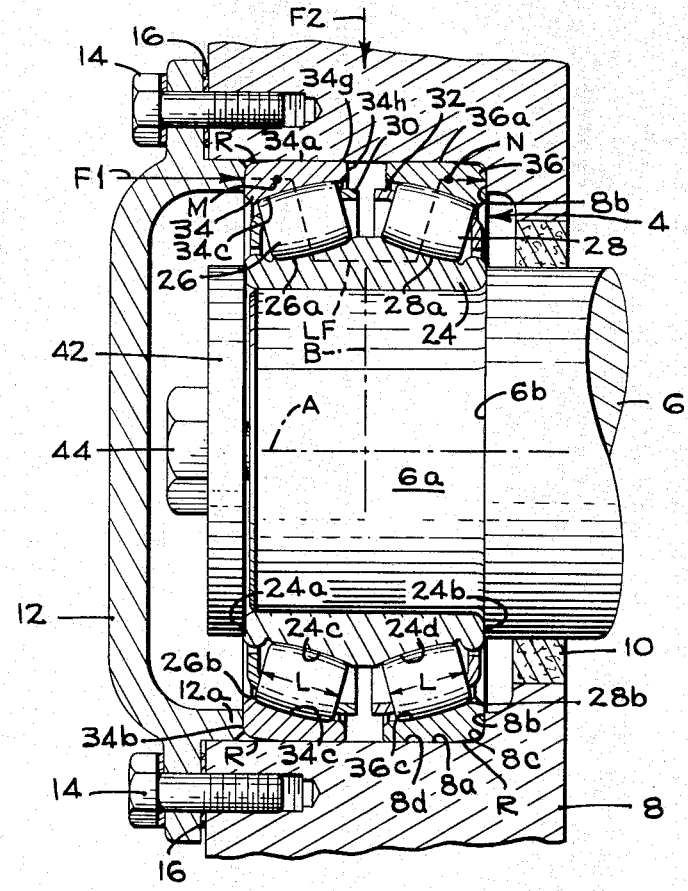
FIG_2
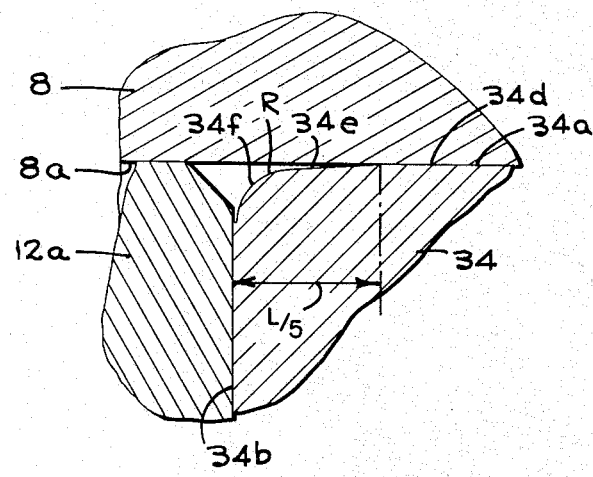

ROLLER BEARING WITH TAPERED OUTER RACE RING

BACKGROUND OF THE INVENTION

1. Field of the Invention

This invention relates to roller bearings and is particularly applicable to split outer race double row spherical roller bearings.

2. Description of the Prior Art

In a conventional roller bearing, such as split outer race double row roller bearings, the outer surface of the outer races are cylindrical in conformation, and usually are received in a cylindrical bore, or seat of a housing. Frequently, double row roller bearings are end-loaded when assembled with zero or negative radial clearance (pre-loading). With this arrangement, fatigue failures at the edges of the rollers are common, particularly under heavy radial loads.

SUMMARY OF THE INVENTION

In the preferred form of the present invention, a double row, spherical roller bearing has two outer race rings which are relieved at their outer ends to overcome edge loading of the roller elements when the bearing is subjected to axial preloading and to radial loads. The configuration of the outer race permits the outer race to shift and to redistribute the load on the rollers and relieve the edge thereof from excessive loading.

It is one object of the present invention to provide a bearing in which the circumference of the rollers will not be subjected to early fatigue failure at the ends.

It is another object of the invention to provide an improved bearing assembly for a double row spherical roller bearing wherein the outer peripheral portion of the outer race rings of the bearing are tapered to relieve the loading on the circumferential ends of the rollers.

The nature of the invention will become more apparent upon consideration of the figures of the accompanying drawings and the associated description.

BRIEF DESCRIPTION OF THE DRAWINGS

FIG. 1 is a fragmentary, sectionalized view of a bearing assembly wherein axial preload is applied to a double row, spherical roller bearing of unique construction.

FIG. 2 is an enlarged, sectionalized view of a portion of the view of FIG. 1 and illustrates the manner in which an outer race ring is tapered near one axial end thereof in accordance with the teachings of the present invention.

DESCRIPTION OF THE PREFERRED EMBODIMENT

FIG. 1 shows a double row, spherical roller bearing 4 which receives the end 6a of a rotatable shaft 6. The bearing 4 is mounted within a cylindrical bore 8a in housing member 8. An annular seal ring 10 is mounted in the housing in engagement with the rotatable shaft. An end cover 12 is removably attached to the housing member 8 by a plurality of circularly spaced bolts, such as the bolts 14. A shim 16 is provided between the housing and cover.

The bearing 4 includes an annular inner race ring 24, a complement of canted spherical rollers 26, a complement of canted spherical rollers 28, a first roller retainer 30, a second roller retainer 32, a first outer race ring 34, and a second outer race ring 36. The end portion 6a of shaft 6 is of reduced diameter to receive the inner race of the bearing. The bore 8a comprises a cylindrical surface or seat 8d that merges at a corner 8c with a radial shoulder surface 8b of the member 8. The outer surfaces 34a and 36a of race rings 34 and 36 are seated on the cylindrical surface 8d of the bearing seat 8a. The inner race ring is retained on the end shaft portion 6a by means of a clamp plate 42 and a bolt or bolts 44 threaded into tapped holes in the shaft. The clamp plate abuts one radial end surface 24a of the inner race ring and urges the other radial end surface 24b of the inner race ring into contact with a radial shoulder 6b on the shaft.

The end cover 12 includes a circular flange 12a that abuts one radial end surface 34b of the outer race ring 34. Tightening of bolts 14 exerts a pre-loading force F1 on outer ring 34 which is transmitted to the complement of rollers 26, the inner ring 24, the complement of rollers 28, the outer ring 36, and the radial shoulder 8b against which the outer ring 36 abuts, as indicated by the line of force LF.

The inner race ring 24 is symmetrical about a medial plane B normal to the shaft axis A. The outer race rings 34 and 36 are of identical construction and are symmetrically arranged (in reversed positions) about the aforesaid medial plane B. The outer race rings 34 and 36 have raceways 34c, 36c, and the inner race ring 24 has raceways 24c and 24d. All of these raceways are of arcuate conformation in profile (as viewed in FIG. 1). The outer surfaces 26a, 28a of the rollers 26, 28 in profile (as viewed in FIG. 1) are also arcuate in conformation and closely approximate the arcuate curvature of the raceways. The roller elements 26 and 28 are disposed at equal angles to the shaft axis.

The details of construction of the bearing 4, to the extent described above, have been utilized heretofore. One of the problems encountered in a bearing of this type, particularly when a large preloading force F1 is applied thereto, is that the end edges 26b, 28b of the rollers (the end edges most remote from the medial plane B) undergo early fatigue failure when the bearings are subjected to a heavy vertical load F2 acting through the housing 8. In this regard, it will be noted that the outer race rings 34 and 36 are wedge shaped because of the angle of the rollers, and the preloading force F1 acting through the wedge shaped members 34, 36 significantly increases the edge loading of the rollers.

To prevent excessive edge loading, a tapered relief R (FIG. 2) is provided in the construction of the present invention on the outer edges of the outer race rings to permit a deflection of the outer rings. This deflection alleviates the loading and reduces the fatigue induced by an overload condition.

As shown in FIG. 2, the outer surface 34a of outer race ring 34 includes a cylindrical portion 34d, a relieved tapered, or conical portion 34e (which may, instead, be curved), a circular corner portion 34f which joins the conical portion 34e with the end surface 34b, and a corner portion 34g which joins the cylindrical portion 34d with end face 34h. Outer race ring 36 is similarly constructed. In a typical bearing constructed in accordance with the present invention, the length of the relieved section 34e will be L/5 where L is the length of the rollers 26 or 28. The relieved surface 34e defines an angle of say, 1° more or less (and, in fact, may be only 10 minutes) with the cylindrical surface 8a of the housing.

If a section is taken through the uppermost portion of the outer race rings 34, 36 on a vertical plane, the points M and N would define the centroids of these areas. Axes through these points, respectively, perpendicular to the vertical plane of the section (and therefore perpendicular to the page) constitute centroidal axes. Under a heavy vertical load F2 and/or a heavy axial preload F1, the outer race ring 34, by virtue of relieved surface 34e and the angular or curved relief, can shift clockwise about the centroidal axis through the point M, and the outer race ring 36 can shift counterclockwise about the centroidal axis through the point N.

The shifting of the outer race rings about the points M, N at the top of the race rings relieves the load at the edge zone of the rollers. It is this zone which, in conventional roller bearings, is subject to early fatigue failure because of overloading of the bearing or because of nonsphericity of the outer race rings 34, 36. Even under normal loads, the relieved outer race rings of the present invention permit a more even distribution of the load on the rollers, and prevent the rollers from being pinched, as by any imperfection in the inner race ring.

Although the best mode contemplated for carrying out the present invention has been herein shown and described, it will be apparent that modification and variation may be made without departing from what is regarded to be the subject matter of the invention.

What is claimed is:

1. A roller bearing for mounting in a member, said bearing having an inner race, a circle of canted rollers, and a wedge shaped outer race, the outer surface of said outer race having a central cylindrical portion for receipt in said member, the improvement comprising a relieved portion on the outer surface of said outer race with a diameter gradually and progressively diminishing from said central cylindrical portion to the end of the race to permit cocking of the outer race to equalize the distribution of the load on the rollers and relieve excessive load on the edges of the rollers.

2. A roller bearing for mounting in a member, said bearing having an inner race, two circles of oppositely canted rollers, and two-wedge-shaped outer races received, respectively, on said circles of rollers, the outer surfaces of said outer races having cylindrical portions for receipt in said member, the improvement comprising a relieved portion on each of said outer races to permit tilting of said outer races in opposite directions to relieve excessive loading on the edges of the rollers from end or radial loading of the outer races.

3. A bearing assembly comprising, in combination, a bearing having two rows of roller elements contained within two separate outer race rings, at least one of the race rings having a relieved end portion tapered to permit the outer race ring to rotate about its centroidal axis, this particular race ring being seated in a bearing seat, means for applying an axial preload to the bearing, whereby upon application of a radial load to the bearing, the outer race ring will shift about its centroidal axis thus distributing the radial load and preventing roller edge loading.

4. A bearing assembly comprising, in combination, a bearing seat, a bearing having two circular rows of roller elements between an inner race ring and two outer race rings, each outer race ring having an inner end confronting the inner end of the other outer race ring, the outer peripheral surface of each outer race ring having a cylindrical portion leading from the outer end of the race ring toward the inner end of the race ring, the outer peripheral surface of each outer race ring further having a relieved portion characterized by decreasing diameter in the direction toward the outer end, the relieved portion leading from the outer end of the race ring toward the inner end of the race ring, the outer race rings being fitted into the bearing seat with the cylindrical portions in contact with the bearing seat and with the relieved portion at a slight angle to the bearing seat to permit canting of the outer race rings when the bearing is subjected to an excessive load.

5. The assembly set forth in claim 4 wherein the raceways of the inner and outer race rings and the rollers are oriented at an angle to the central axis of the bearing assembly.

6. A bearing assembly comprising, in combination, a spherical roller bearing having an inner race ring, two rows of spherical rollers encircling said inner race ring, two outer race rings encircling said two rows of spherical rollers, both outer race rings being fitted into a bearing seat, said outer race rings being identical and being symmetrically arranged, each outer race ring having a relieved circumferential portion that tapers smaller toward the outer end of the race ring, each outer race ring further having a circumferential portion that is firmly seated in substantial area contact with a corresponding portion of the bearing seat, said tapered portion normally remaining out of contact with a corresponding surrounding portion of the bearing seat, and means to apply an axial preload to the spherical roller bearing.

* * * * *